US012812264B2

(12) United States Patent
Puetter

(10) Patent No.: US 12,812,264 B2
(45) Date of Patent: Nov. 24, 2026

(54) IMAGE SENSOR WITH EXTENDED DYNAMIC RANGE

(71) Applicant: Micro Biz Ventures LLC, Poway, CA (US)

(72) Inventor: Richard C. Puetter, San Diego, CA (US)

(73) Assignee: MICRO BIZ VENTURES LLC, Poway, CA (US)

(*) Notice: Subject to any disclaimer, the term of this patent is extended or adjusted under 35 U.S.C. 154(b) by 50 days.

(21) Appl. No.: 19/083,363

(22) Filed: Mar. 18, 2025

(65) Prior Publication Data

US 2025/0301237 A1 Sep. 25, 2025

Related U.S. Application Data

(60) Provisional application No. 63/567,738, filed on Mar. 20, 2024.

(51) Int. Cl.

*H04N 25/59* (2023.01)
*H04N 25/46* (2023.01)
*H04N 25/58* (2023.01)
*H04N 25/767* (2023.01)
*H04N 25/78* (2023.01)

(52) U.S. Cl.

CPC ............. *H04N 25/59* (2023.01); *H04N 25/46* (2023.01); *H04N 25/58* (2023.01); *H04N 25/767* (2023.01); *H04N 25/78* (2023.01)

(58) Field of Classification Search

CPC ........ H04N 25/59; H04N 25/46; H04N 25/58; H04N 25/767; H04N 25/78; H04N 25/683

See application file for complete search history.

(56) References Cited

U.S. PATENT DOCUMENTS

| | | | | |
|---|---|---|---|---|
| 10,334,189 | B1 * | 6/2019 | Xu | H04N 25/13 |
| 2016/0118424 | A1 * | 4/2016 | Guidash | H04N 25/46 257/231 |
| 2021/0134872 | A1 * | 5/2021 | Kim | H04N 25/134 |
| 2021/0392303 | A1 * | 12/2021 | Park | G06T 3/4015 |
| 2022/0261963 | A1 * | 8/2022 | Huggett | G06T 3/4092 |
| 2023/0027452 | A1 * | 1/2023 | Powell | G06T 3/4007 |
| 2023/0164447 | A1 * | 5/2023 | Wang | H04N 25/134 348/229.1 |
| 2024/0187746 | A1 * | 6/2024 | Heo | H04N 23/843 |

* cited by examiner

*Primary Examiner* — Twyler L Haskins
*Assistant Examiner* — John H Morehead, III
(74) *Attorney, Agent, or Firm* — Eleanor Musick; Torrey Pines Law Group PC

(57) ABSTRACT

An image sensor for detecting a wide dynamic range within an image with improved color sampling and reduced susceptibility to motion artifacts includes an array of pixels arranged in one or more unit cells in which each unit cell includes multiple binning units having progressively increasing binning sizes. The binning units are configured to generate charges at increasing binning levels which can be accumulated at an on-sensor memory. If a binning unit includes a faint pixel, a processor increments the binning to the next higher binning level and combines the charges generated at the multiple binning levels at the on-sensor memory for input to an amplifier.

20 Claims, 13 Drawing Sheets

600

IMAGE SENSOR WITH EXTENDED DYNAMIC RANGE

RELATED APPLICATIONS

This application claims the benefit of Provisional Application No. 63/567,738, filed Mar. 20, 2024, which is incorporated herein by reference in its entirety.

FIELD OF THE INVENTION

The present invention relates to solid-state imaging devices and more particularly to on-chip image sensor systems with extended dynamic range, improved color sampling, and reduced susceptibility to motion artifacts.

BACKGROUND

Image sensors can be used in a variety of applications. For example, an image sensor system can be integrated into an imaging device to capture images. Such an image sensor system can use a solid-state silicon image sensor array (e.g., solid-state image sensor) and is generally referred to as a solid-state imaging device.

Despite major improvements in solid-state image sensors and imaging capturing/processing technology, current image sensors (which include solid-state imaging device(s)) may have a maximum photo-signal storage capacity that can limit the dynamic range of the particular system. The photoelectric charge generated can be stored on the naturally occurring capacitance associated with the sensor design or artificially enhanced capacitance. The charge handling capacity can be limited by the maximum charge swing in the integrated circuitry and the storage capacitance within the pixel. The amount of integrated photo-charge can be directly related to the time that the image sensor collects and integrates the signal from the scene, such as "integration time." A long integration time may be appropriate for weak signals since more photo-charge is integrated within the pixel and the signal-to-noise of the image sensor can also be improved. However, once a maximum charge capacity is reached, the sensor no longer senses image brightness, resulting in data loss.

Intra-scene dynamic range refers to the range of incident light that can be accommodated by an image sensor in a single frame of pixel data. Two common problems faced by all cameras are scenes with wide dynamic range (WDR) and poor sensitivity in low-light situations. Examples of high dynamic range scenes include an indoor room with a window view of the outdoors, an outdoor scene with mixed shadows and bright sunshine, and evening or night scenes combining artificial lighting and shadows. In a charge-coupled device (CCD) or complementary metal-oxide semiconductor (CMOS) active pixel sensor (APS), the typical dynamic range (e.g., 1,000:1), while greater than that of the human eye (about 100:1), is inadequate to capture the wide variation in illumination between indoor and outdoor lighting, which can vastly surpass that of the eye and common sensors. In addition, there are many practical operational demands on the sensors. For example, sensor yield and cost demands suggest that image sensors should be small to increase the pixel number for a given sensor area. Additionally, maximum exposure times are usually limited to 1/30 sec or less to avoid blurring arising from movement of the camera, which is often hand-held. Such situations suggest larger pixels to allow the maximum light to be collected in a given amount of frame exposure time. Finally, current color sensors for cell phone cameras use large blocks of adjacent pixels of the same color to avoid on-sensor wire-routing/multiplexing complexity but suffer inferior performance because of poor sampling and color aliasing.

Technical solutions have been proposed to address the above-described issues, including displaying large dynamic range images (e.g., 12-bit images) on lower dynamic range (e.g., 8-bit) displays. One example of a proposed solution is described in U.S. Pat. No. 7,432,933 of Walls, et al., which applies different tonal and color transformations to each pixel. Other solutions include the addition of sensors that adjust the pixel exposure time, an example of which is described in U.S. Pat. No. 7,616,243 of Kozlowski (assigned to AltaSens, Inc.), pixel gain, such as the approach described in U.S. Pat. No. 7,430,011 of Xu et al. (assigned to OmniVision Technologies, Inc.), and using multiple-sized photoactive pixels, such as the technology described in U.S. Pat. No. 7,750,950 of Tamara, et al. (assigned to Fujifilm Corporation) to collect WDR images in a single exposure.

Challenges associated with high dynamic range imagery can lead to serious and frequent practical limitations in image capture applications including surveillance, security video, and the like. Consequently, there has been considerable effort to resolve such challenges. In some situations, simple, direct, pixel binning, or more sophisticated, adaptive binning after the signal has been read from the sensor can greatly increase a signal-to-noise ratio (SNR). For example, Artyomov and Yadid-Pecht ("Adaptive Multiple-Resolution CMOS Active Pixel Sensor", *IEEE Trans. Circuits and Systems,* 53 (10), pp. 2178-2186, 2006) describe a sensor that can adaptively bin the signal into a quadtree data structure depending on pixel-to-pixel signal level variations in the pixel group. In another example, Wandell, et al. ("Multiple Capture Single Image with a CMOS Sensor," in *Proc. of the Int'l Symp. on Multispectral Imaging and Color Reproduction for Digital Archives*, Chiba, Japan, October 1999, pp. 11-17) presents a CMOS sensor that can adaptively bin cells and customize individual exposure times. However, such approaches can require relatively high total pixel counts.

At the low end of the dynamic range, the low-light performance of imaging devices, such as an imaging device implemented in a mobile device, has been compromised by the competing desire to have small sensors and large numbers of pixels. The desire for the small sensor is obvious—it reduces cost through improved yield and lower physical size and optics. The desire for large numbers of pixels is also clear—more pixels provide higher spatial resolution in pictures when there is plenty of light. However, on the negative side, smaller pixels collect less light. Eventually, the number of photo-generated charges collected falls significantly below the read noise. If read noise is significant such that it strongly affects low-noise sensitivity, after readout of the image, digital binning of the image is suboptimal since every read introduces more read noise. In this case, as pointed out in US RE47,523 (incorporated herein in its entirety), on-sensor charge binning can be a technical solution so that the charge from all the binned pixels suffers only one share of read noise.

To achieve WDR and low-light sensitivity, modern CMOS sensors can be designed to achieve extremely low levels of read-noise, e.g., a few electrons or less, and sub-fF gate capacitances along with high-performance switches connecting the photoactive sites to the gates (See, e.g., Boukhayma, Caizzone, and Enz, "A CMOS Image Sensor Pixel Combining Deep Sub-Electron Noise with Wide Dynamic Range", *IEEE Elec Dev Letters,* 41 (6) pp. 880-

883 (2020), and references therein). Such low capacitances can reduce technical concerns associated with kTC noise (reset noise), with its random thermal generation of charge ($Q_{RMS}=\sqrt{KTC}=0.4\ e^-$ for 1 fF at 300K) that "refreshes" on every switch opening and closing when different electrical components come to thermodynamic equilibrium. (kTC can be completely eliminated by correlated double sampling or it can be considered part of the read noise if correlated double sampling is not used.) With sub-electron read noise performance, the dominant noise source becomes photon-counting statistics, removing the advantage of on-sensor charge binning and making it more sensible to do the binning digitally off-sensor.

Despite these advanced technologies, there are still many sensors that suffer sufficient read noise to hinder low-light imaging. Consequently, much effort has been spent on image denoising. One example of an off-sensor denoising (or smoothing) approach is the PIXON™ method, which is described in several U.S. Pat. Nos. 6,353,688, 6,490,374 and 6,993,204, among others, which are incorporated herein by reference. While technically not a charge binning technique, the PIXON™ method is a forward-only, minimum-complexity image modeling technique that can reduce noise. The PIXON™ method is an iterative, non-linear technique that may be too compute-intensive for mobile devices such as smartphones. Another approach can be found in Apical Limited's sinter algorithm, which involves altering the area image intensity values of an image according to a dynamic range compression transform. A description of this algorithm can be found in U.S. Pat. No. 7,302,110 of Chesnokov. The output image intensity is modified relative to the input image intensity according to a local area amplification coefficient. Unfortunately, this approach is also computationally expensive.

As the demand for imaging devices that can capture high-quality images increases, there is a growing need for imaging sensors with a high dynamic range. Such high-quality images often require a broad dynamic range to accurately capture details across various lighting conditions. Image sensors that can adapt to different levels of light intensity are essential to achieve these goals. Additionally, these image sensors should have the capability to capture images with a high pixel density, enhancing the detail and clarity of the images produced. Moreover, as the trend towards smaller, more compact devices continues, there is a growing demand for image sensors with a smaller form factor. These compact sensors are particularly desirable for integration into handheld devices like smartphones, tablets, and image sensors, where they can capture images with high pixel density, meeting the user's needs for portability without compromising on image quality.

SUMMARY

To resolve the technical deficiencies in designing such image sensors with a high pixel density by enhancing the broad dynamic ranges (e.g., detail and clarity of the images produced), the inventive approach provides an image sensor that can capture images with wide dynamic ranges and high pixel density. Specifically, the inventive image sensor generates a highly sensitive, wide dynamic range (WDR) image by combining multiple exposures with varying exposure times and on-sensor charge binning techniques.

An enhanced image can be generated in a single exposure because multiply-binned images are formed while a single image is collected, further providing the advantage of minimizing motion artifacts. These multiply-binned exposures need only be read out at the end of image collection. This is done relatively efficiently since the more highly-binned images have many fewer pixels to read out. This procedure also provides significant, on-sensor binning flexibility, allowing several different levels of spatial binning, white-light image collection, and/or color images, without complex wiring or the need for the adjacent placement of pixels of the same color, thereby reducing aliasing. The ability to gather all these differently exposed and binned images is achieved through the use of on-sensor charge storage for each unit cell.

In one aspect, an image sensor for detecting a wide dynamic range within an image includes an array of pixels arranged in one or more unit cells in which each unit cell includes multiple binning units having progressively increasing binning sizes. The binning units are configured to generate charges at increasing binning levels which can be accumulated at an on-sensor memory. If a binning unit includes a faint pixel, a processor increments the binning to the next higher level and combines the charges generated at the multiple binning levels at the on-sensor memory for input to an amplifier.

The inventive scheme assembles a multiple-exposure, multiply-binned image that sees both the bright sources and the faint sources with the maximum SNR and spatial resolution for each location. This approach is particularly beneficial in scenarios where read noise is a significant factor. This approach can be applied to both CCD and CMOS sensor types, although the example implementations predominantly illustrate CMOS sensors. In some applications, the inventive image sensors can employ CCD type image sensors.

In one aspect, the inventive an image sensor includes a substrate; one or more on-sensor charge storage disposed on the substrate; an output amplifier disposed on the substrate; a pixel array comprising a plurality of pixels disposed on the substrate, each pixel configured to generate a charge in response to detection of light impinging on the pixel, the pixel array comprising one or more unit cells, each unit cell comprising a block of interconnected pixels; wherein a plurality of binning units are defined within each unit cell, each binning unit comprising a subgroup of pixels, the plurality of binning units having a plurality of different binning unit sizes corresponding to different binning levels, wherein a first binning level comprises a smallest binning unit size and each subsequent binning level is a multiple of the binning unit size of a preceding binning level, and wherein a processor is configured for controlling the charges generated by the pixel array during an exposure period by: (a) transferring charges for a first binning unit to the one or more on-sensor charge storage beginning with a first binning level; (b) comparing the transferred charges to a threshold to determine whether any pixel within the first binning unit is a faint pixel having an intensity below the threshold; (c) if a faint pixel is determined within the first binning unit, transferring charges for a second binning unit having a binning unit size larger than the first binning unit to the one or more on-sensor charge storage to provide a second binning level; (d) comparing the transferred charges to the threshold to determine whether any pixel within the second binning unit is a faint pixel; (e) if a faint pixel is determined within the second binning level, repeating transferring charges from subsequent binning levels until faint pixels are not determined; and summing the charges from the first binning level and any subsequent binning level to the output amplifier to generate an output comprising combined charges from each binning unit for the exposure period. The block of interconnected pixels in each unit cell may be a multi-channel array of color pixels, wherein steps (a) through (e) are performed separately for each color within the unit cell. The one or more on-sensor charge storage may include multiple on-sensor charge storages with one storage for each channel in the multi-channel array. The multi-channel array may include three or four colors. In some implementations, each first binning unit may be a Bayer pattern and each second binning unit may be an array of first binning units. In some implementations, each first binning unit may be a 3×3 arrangement and the second binning unit may be a 2×2 arrangement of first binning units. In other implementations, each first binning unit may be a color block of a single color and each second binning unit may be a Bayer pattern of multiple different single-color blocks. In still other implementations, each first binning unit may be a 3×3 arrangement of single-color pixels and each second binning unit may be a 2×2 arrangement of first binning units having different color pixels. The second binning unit may be a Bayer pattern. In some implementations, each first binning unit may be a pattern of blocks having equal colors and each second binning unit comprises a matrix of equal color blocks. Each first binning unit may be a 3x3 arrangement of different color pixels and each second binning unit may be a 2×2 pattern of first binning units.

In some implementations, the block of interconnected pixels in each unit cell may be a monochrome array of pixels.

In some embodiments, the threshold for determining a faint pixel is determined based on a signal to noise ratio (SNR).

The image sensor may further include an on-sensor shift register in communication with the one or more on-sensor charge storage, the on-sensor shift register configured to receive and combine charges for each first level binning unit within the unit cell and transfer the combined charges to the one or more on-sensor charge storage. The on-sensor shift register may be further configured to receive and combine charges for each subsequent binning unit within the unit cell and transfer the combine charges to the one or more on-sensor charge storage. In some embodiments, the image sensor may further include a reset switch configured to reset the one or more on-sensor charge storage after no further binning levels are required. The exposure period may be multiple exposure times, wherein different binning units are exposed for different exposure times.

In some implementations, the inventive image sensor may be incorporated in a smartphone. The processor may be associated with the smartphone.

In another aspect, the inventive image sensor includes one or more on-sensor charge storage configured for receiving charges from a pixel array comprising a plurality of pixels, each pixel configured to generate a charge in response to detection of light impinging on the pixel, the pixel array comprising one or more unit cells, each unit cell comprising a block of interconnected pixels; wherein a plurality of binning units are defined within each unit cell, each binning unit comprising a subgroup of pixels, the plurality of binning units having a plurality of different binning unit sizes corresponding to different binning levels, wherein a first binning level comprises a smallest binning unit size and each subsequent binning level is a multiple of the binning unit size of a preceding binning level, and wherein a processor is configured for controlling transfer to the one or more on-sensor charge storage of the charges generated by the pixel array during an exposure period based upon detection of faint pixels at a given binning level, wherein charges are transferred to and accumulated at the one or more on-sensor charge storage beginning with a first binning level and continuing with subsequent levels if faint pixels are detected within the preceding binning level; and summing the charges from the first binning level and any subsequent binning level to an output amplifier to generate an output comprising combined charges from each binning unit for the exposure period.

BRIEF DESCRIPTION OF THE DRAWINGS

Embodiments of this disclosure will now be described by way of non-limiting examples, with reference to the accompanying drawing in which like reference numerals can indicate identical or functionally similar elements.

DETAILED DESCRIPTION OF EMBODIMENTS

Figure 1:
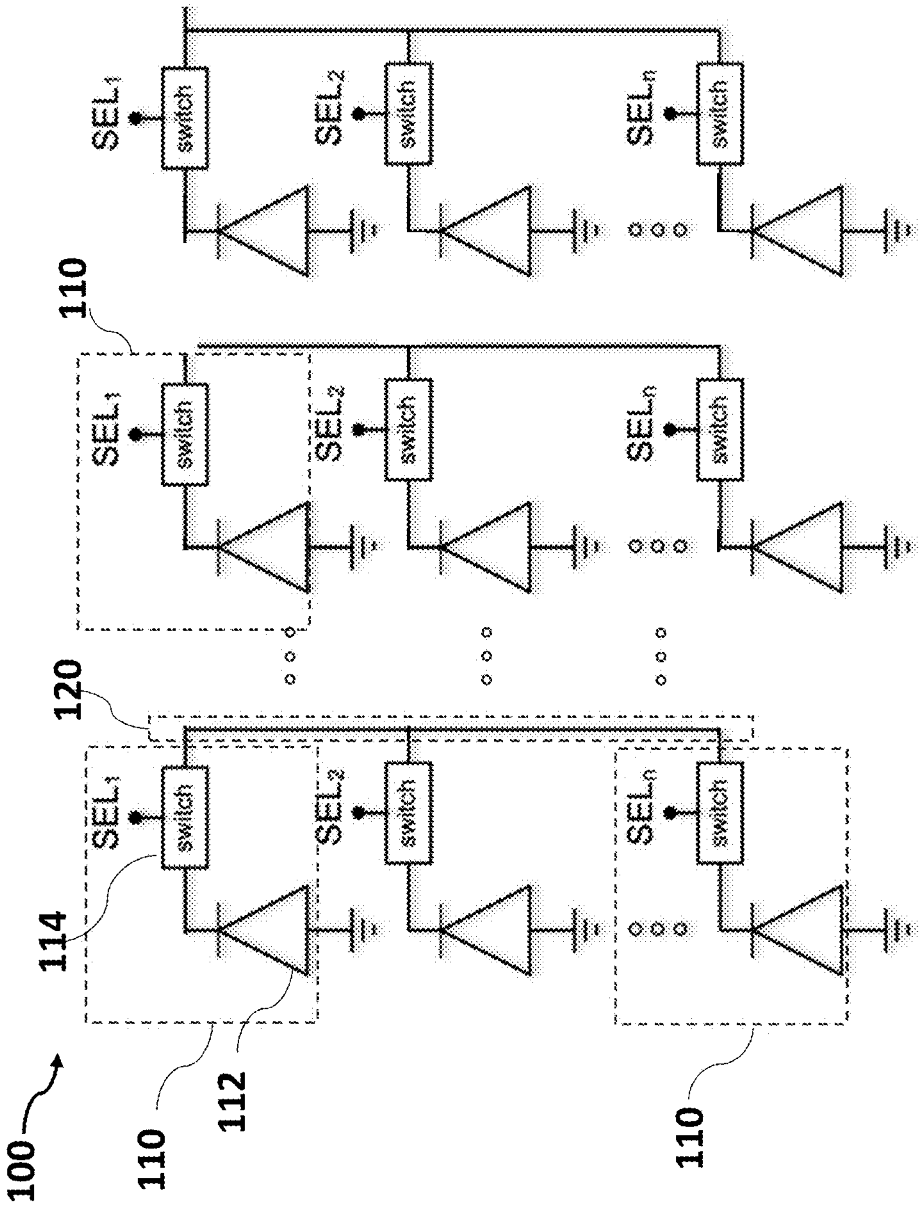
FIG. 1 illustrates an example of a CMOS sensor having an array of circuitries according to an embodiment of the inventive approach.

The following detailed description of embodiments presents various examples of implementations of the inventive image sensor. As will become apparent to those of skill in the art based on these illustrative examples, a variety of different implementations may be employed to achieve the overall objects of the inventive approach—to provide an image sensor with a broad dynamic range to accurately capture details across various lighting conditions with reasonably efficient usage of chip "real estate," improved color sampling and SNR, and reduced susceptibility to motion artifacts. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

As is known in the art, to capture color images with a digital image sensor, it is common to place a filter over each pixel in a sensor array to transmit only specific wavelengths of light to the sensor. Accordingly, the description of a pixel as having a particular color, e.g., red, blue, green, white, or a colored pixel includes the filter that causes a given pixel to detect the color corresponding to a filter. Further, reference to a "color" that is detectable by an image sensor pixel encompasses a range of detectable wavelengths which, in some cases, can extend beyond visible wavelengths. Thus, while the examples described herein relate primarily to visible color wavelengths of red (~600 nm to ~750 nm), green (~500 nm to ~600 nm), blue (~400 nm to 500 nm), cyan (~485 nm to ~520 nm), and yellow (~565 nm to 590 nm), for purposes of the inventive scheme, the term "pixel colors" is intended to also encompass non-visible light wavelengths detectable by pixels, including infrared (all wavelengths longer than visible wavelengths) and ultraviolet (all wavelengths shorter than visible wavelengths).

Aspects of the present disclosure can provide an optimal hardware implementation of an image sensor. Specifically, the optimal hardware implementations disclosed in the present disclosure can correspond to methods (e.g., readout methods) for obtaining the highest SNR and spatial resolution images, for example, when read noise is the dominant noise source. For example, various 3-color (or more) shared-pixel architectures can be implemented in which the image sensor can be divided into "unit cells." "Unit cells" are blocks of interconnected pixels of different colors that share one or more output amplifiers and charge memories. In some examples, the method can include two steps. For example, in the first step, image frames of the same scene can be collected with different exposure times (for t in the short exposure list), from the shortest to the longest (=NETF, or Nominal Exposure Time Frame). These frames can be used to capture images of bright objects that would be over-exposed on the NETF, and these frames can refer to unbinned image frames that can provide the highest spatial resolution for the bright objects. After assembly, the final image can have a very wide dynamic range, so not all pixels will have useable exposures in all frames. The methods disclosed herein can be initiated with the brightest pixels first. In some examples, pixels can be separated into bright pixels and faint pixels by, for example, using tracking values (e.g., grayscale images that represent the brightness of the pixel) associated with each pixel. It should be noted that "faint" pixels may also be referred to as "dark" pixels. All pixels start as faint pixels and become bright pixels once their final value is established. Thus, at each stage, the image sensor may only need to collect data from faint pixels that are neither under-nor over-exposed. Since these pixels can appear in multiple exposures/binnings, they can be combined in an optimal way for different exposures/binnings. This is more important for the different exposure frames because they are independent with different noise level, whereas there is an optimal binning for a frame of a given exposure. If there are different exposures, the data from the optimal binning for each exposure should be combined.

In some examples, the second step can begin to collect frames with different combinations of pixel binning (for b in the binned frame list) of the NETF frame. To be efficient with sharing on-sensor resources, each pixel color can have its own on-sensor charge accumulation site (charge memory). The goal of the second step is to detect sources that have poor SNR in the NETF. Thus, the second step can proceed to collect frames which are coarser and coarser binnings of the NETF. Alternatively, this different binning of the NETF frame could be fresh, newly collected frames, easing some of the complexity of controlling the "in-place" rebinning of the NETF while increasing the total frame time and, thereby, becoming increasingly more susceptible to motion artifacts.

Aspects of the present disclosure can provide a CMOS image sensor through implementation of on-sensor charge storage. In certain embodiments, each on-sensor charge storage can be connected to the output of each unit cell (pixels that share common on-sensor resources, e.g., output amplifiers, charge storage, etc.). This configuration may allow for multiple binning levels by leveraging the on-sensor charge storage. Specifically, numerous copies of the charge storage could be integrated within the unit cell, providing RGB color charge memories for each of the smallest binning groups (groups of pixels that will be binned in one or more of the binned images) in the image. In the nomenclature used herein, binning groups are collections of pixels that are combined as groups into different binning levels, e.g., a 2×2 group of pixels, a 4×4 group of pixels, etc. to define from 1 to N binning levels. In this example, level-1 binning would be the 2×2 pixel binning groups, and the 4×4 groups of pixels would be level-2 pixel binning groups. The progressively larger binning levels provide decreasing spatial resolution images but increasing light sensitivity. A different pixel binning scheme might use the binning groups 3×3 pixels, 9×9 pixels, 27×27 pixels, to define three different binning levels, "level-1", "level-2" and "level-3". The sizes and number of levels of binning groups in the examples are not meant to be limiting, however, in general, higher-level binning groups will be formed from combinations of the next-lower-level pixel binning groups.

FIG. 1 illustrates a non-limiting example of an embodiment of a CMOS sensor 100 according to the inventive scheme. CMOS sensor 100 can include an array of pixels 110. In some examples, each pixel 110 can be utilized to read data (e.g., data associated with the light intensity of the pixel). Each pixel 110 can include a light detector 112 and a switch 114. The light detector 112 can be implemented as a photodiode. In some examples, the light detector 112 (e.g., the photodiode) can detect the intensity of light by detecting the current flow over a given amount of time (exposure time or frame time) which produced and integrated photoelectric charge produced by the light detector 112. The switch 114 can be implemented as a transistor, MEMs switch, and the like. The present disclosure does not limit the types of switches. In some embodiments, the switch 114 can convert the accumulated electron charge (e.g., on the photodiode) into a measurable charge. The switch 114 can also reset the light detector 112 and transfer the measured charge to a vertical column line 120. The size of the array of the pixels 110 can be determined based on the technical specifications of the image sensor, such as the number of pixels that the image sensor can capture, and the present application does not limit the number of pixels 110.

Figure 2A:
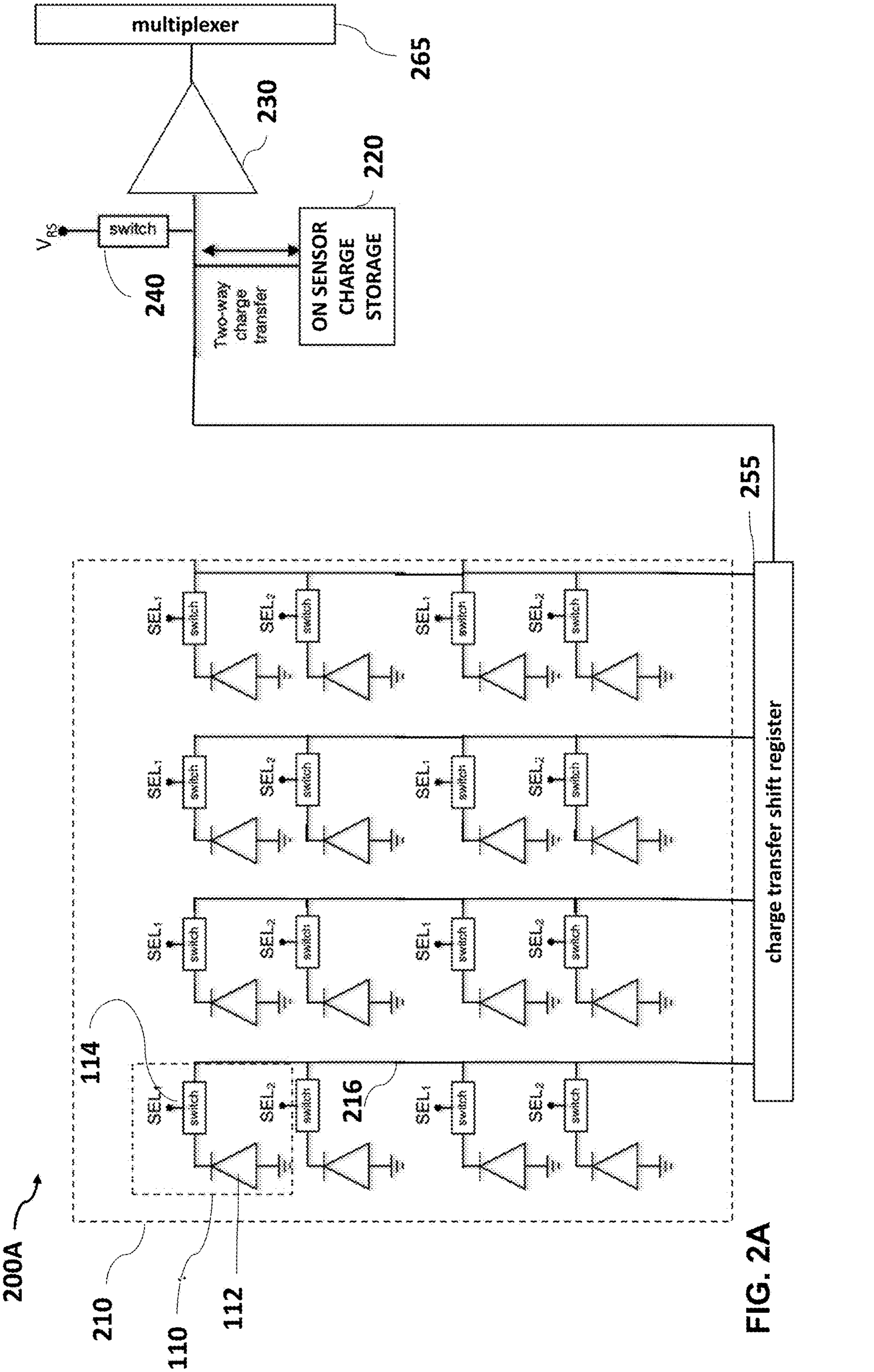
FIGS. 2A-2C illustrate examples of CMOS unit cell topologies according to different embodiments of the inventive image sensor.
Figure 2B:
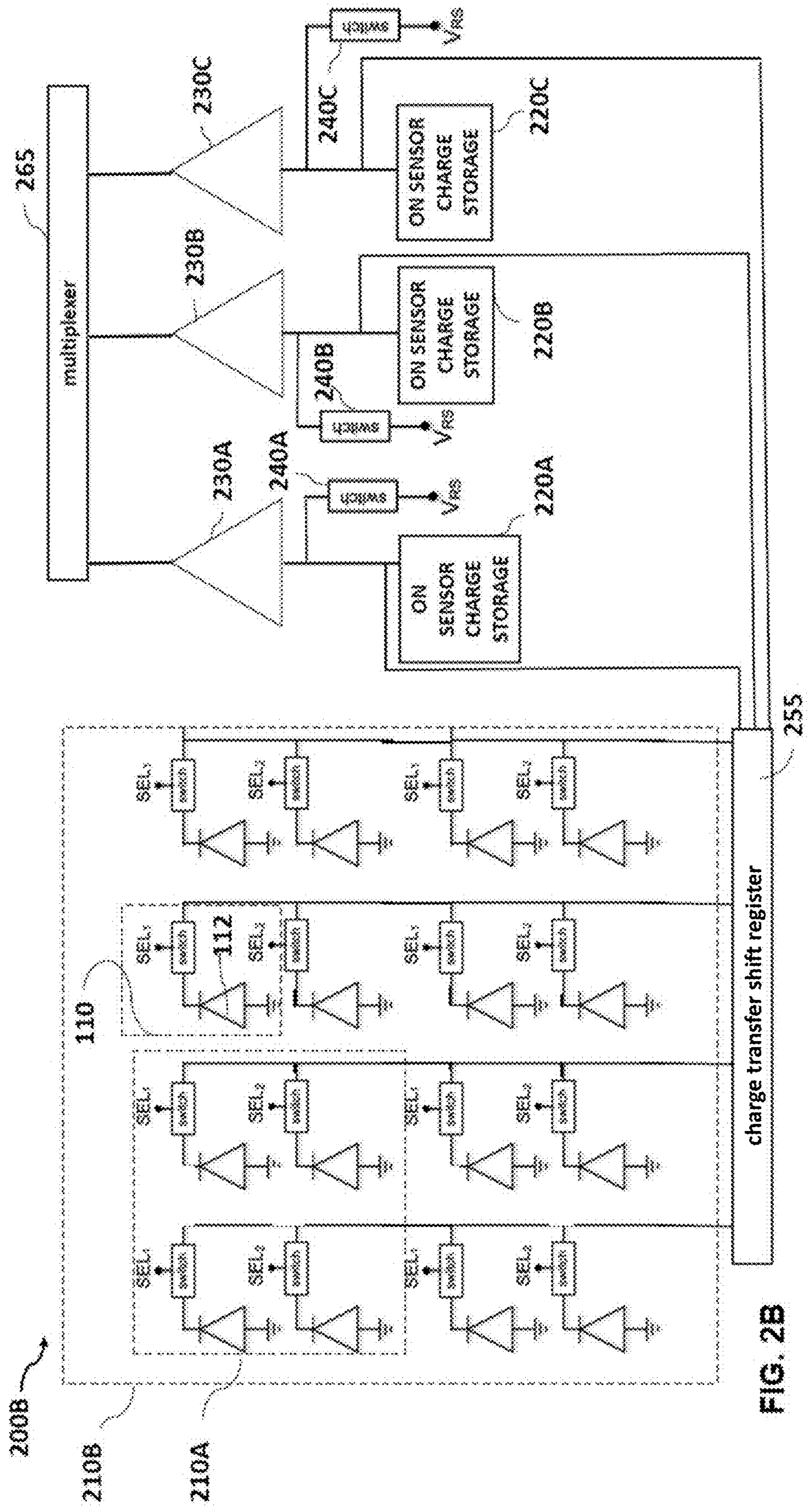
Figure 2C:
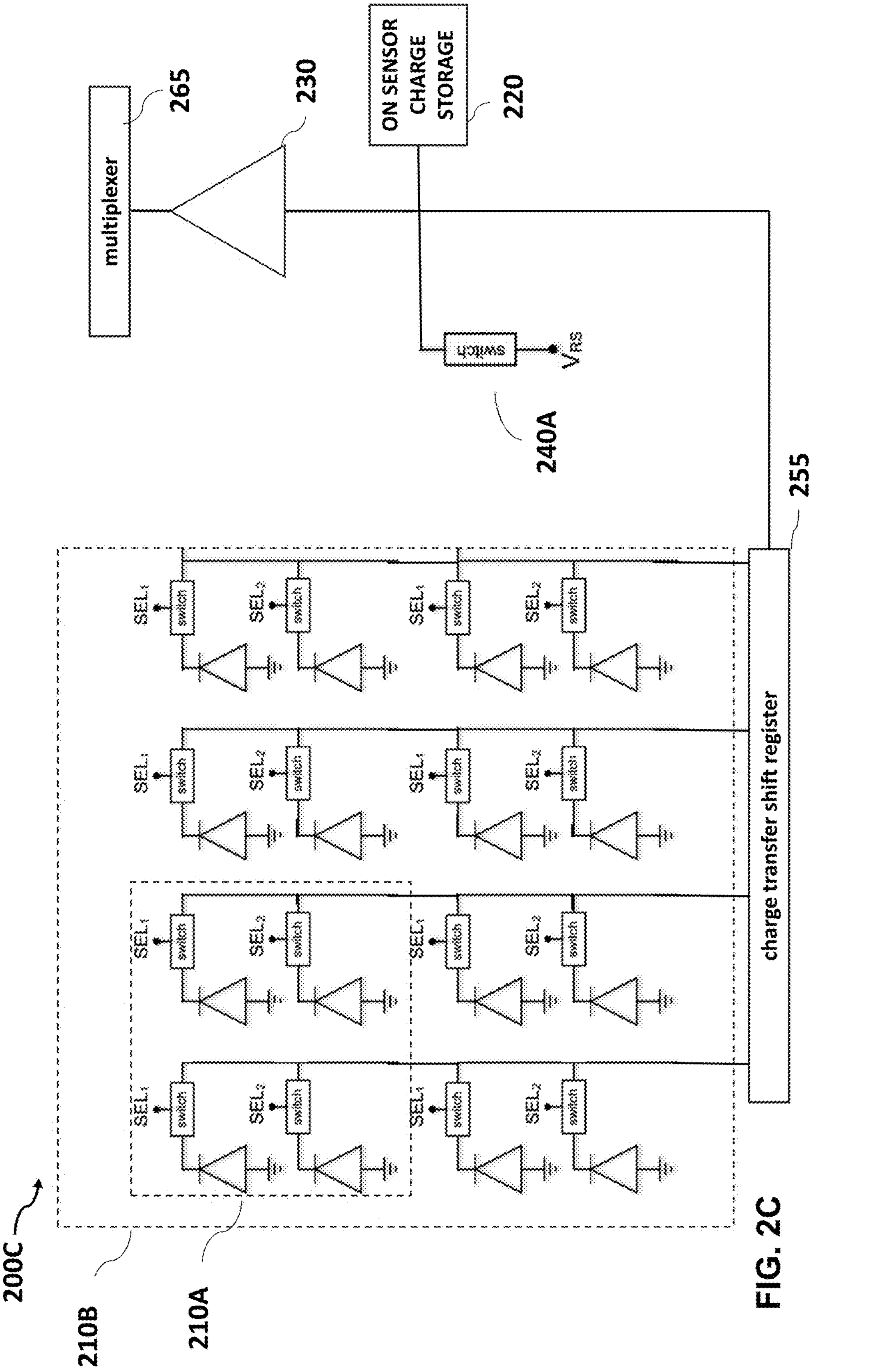

FIGS. 2A-2C diagrammatically illustrate examples of different implementations of inventive image sensor topologies to provide on-sensor, spatially-adaptive binning. Broadly, the inventive approach is to combine charge storage capability on the same substrate as the sensor while controlling the transfer of charge to define multiple binning levels within a single exposure. Thus, the circuit components illustrated in each of FIGS. 2A-2C represent devices that would be integrated onto the sensor substrate along with appropriate interconnect (not shown) for electrically connecting the components. It should be noted that additional elements may also be integrated onto the substrate, however the elements for forming the sensor topology are those illustrated in the figures. FIG. 2A depicts an example of a CMOS sensor topology 200A that can be implemented in conjunction with a CMOS sensor 100 (as shown in FIG. 1) in certain embodiments. Unit cell 210 can be structured as a sub-array within a larger array of pixels in a CMOS sensor. For example, when the CMOS sensor 100 includes a 100×

100 array of pixels, a unit cell could represent a 4×4 sub-array of this larger 100×100 array of pixels.

As illustrated in FIG. 2A, one or more unit cells 210 (one is shown) can be connected to an on-sensor charge storage 220. In some examples, each column of the unit cell 210 can be connected (via on-chip interconnect) to a charge transfer shift register 255, which can be connected (via on-chip interconnect) to on-sensor charge storage 220. Shift register 255 (input clocks and control lines not shown) receives inputs from each pixel 110 within the unit cell 210 and communicates the received inputs to on-sensor charge storage 220. On-sensor charge storage 220 can be configured to store the charge of each pixel by reading the output of the light detector 112 corresponding to each pixel (via the shift register 255). As shown in FIG. 2A, each column of unit cell 210 is connected to input shift register 255. It should be noted that this illustration is merely provided as an example implementation, and other suitable switching mechanisms can be used.

In some embodiments, the on-sensor charge storage 220 can receive a charge from each light detector 112 of the unit cell 210. For example, closing switch 114 within pixel 110 can cause the charge detected by the corresponding light detector 112 to be transmitted to on-sensor charge storage 220 via the column line 216 and the shift register 255. In some cases, on-sensor charge storage 220 can receive charge data from multiple pixels 110 within the unit cell 210. After on-sensor charge storage 220 collects the charges from one or more pixels 110 within unit cell 210, the collected charges for each pixel can be input to amplifier 230. Sensor topology 200A may include a unit cell switch 240 that can be utilized to reset data (charges) stored in on-sensor charge storage 220 and/or the individual pixels. For example, unit cell switch 240 can reset the data after unit cell 210 is exposed to light. In some examples, the amplified signal from amplifier 230 can be transmitted to an output multiplexer 265 (clocks and/or control lines are not shown).

FIG. 2B illustrates another example of a CMOS sensor topology 200B that can be implemented in conjunction with a CMOS sensor according to embodiments of the inventive approach. CMOS sensor topology 200B can include, but is not limited to, multiple binning units 210A, 210B of sensors. In the illustrated example, binning unit 210B with sixteen pixels (4×4 pixels) can encompass all sensors (pixels 110) in a given sensor topology, or it can include smaller binning units, e.g., 210A, with four pixels as shown arranged as a 2×2 pixel grouping. Thus, binning unit 210B can include multiple smaller binning units 210A. In the illustrated example, each level of unit cell (210A and 210B) is connected to a corresponding on-sensor charge storage 220A, 220B, 220C, by way of the sensor readout columns to shift register 255. To further expand the example, binning unit 210A may be a three-channel array, e.g., red, blue, green, in a Bayer pattern, such that the array consists of 1 red, 1 blue, and 2 green pixels. Charges detected by a pixel of a certain color would be separately communicated to the corresponding charge memory for that color. In some implementations, in order for different binnings to interact with each other, the number of pixels binned successively should be a multiple of previous binnings, e.g., a 2×2 binning of binning unit 210A can be followed by a 4×4 binning of binning unit 210B. The binnings can be performed in charge memories 220A-220C as the charge is progressively added together. For example, as shown in the figure, shift register 255 has three outputs corresponding to three different color channels, e.g., red, green, and blue, connected to corresponding color memories, 220A, 220B, or 220C. In some implementations, there may be four outputs from shift register 255 corresponding to red, green, blue, and white, connected to four color memories, in which case a a fourth color memory (not shown) would be included. Additionally, it is possible in some implementations to sum the color memories (not shown) to obtain a monochrome image. Advantageously, having the multiple sizes of binning units (levels) and on-sensor charge storages can enable binning of the pixels of a single light exposure on a CMOS sensor at various levels from the finest (here, 2×2 pixels, in binning unit 210A corresponding to "level-1") to the coarsest (here, 4×4 pixels in binning unit 210B, corresponding to "level-2"). It should be noted that the quantities of binning cells and on-sensor charge storage units shown in FIG. 2B are merely provided as illustrative examples and are not intended to be limiting.

In some examples, each light detector 112 within each pixel 110 can be connected to provide input to shift register 255. Charge transfer shift register 255 collects data from the pixels and transmits the collected photo-charge to the input of an on-sensor output amplifier and/or a charge storage location into which the charge can be pushed. In some embodiments, shift register 255 can collect the charge from the pixels based on one or more levels of binning groups. For example, level-1 might correspond to binning group 210A (2×2 pixels), and level 2 might correspond to binning group 210B (4×4 pixels). While FIG. 2B illustrates a single shift register 255, multiple shift registers may be employed. The number of shift registers 255 can be determined based on specific applications. For example, one of binning groups 210A and 210B can be connected to a different shift register.

As further illustrated in FIG. 2B, various levels of binning can be performed. Binning proceeds from the smallest binning units in terms of number of pixels to the largest binning units. In this example, two levels are shown. Level-1 includes 2×2 pixel blocks 210A. The binning of the charge is executed via shift register 225 to on-sensor charge memories (220A, etc.) for each individual color channel. During readout of an unbinned image, rather than resetting the charge for each pixel, the charge is transferred and summed to the on-sensor memory. For example, if each 2×2 group of pixels uses a standard Bayer pattern (½ green, ¼ red, ¼ blue), each red and blue pixel will be stored in the respective red and blue charge memories and the two green pixels will be summed and stored in the green charge memory. Level-2 binning involves taking the charges from each of the four level-1 binning units and summing them onto the amplifier input. There may either be a single amplifier for all colors or, as shown, dedicated amplifiers 230A-230C may be provided. In this example, beginning with red and proceeding to green then blue, the stored charges are summed on the amplifier input. First, the four red charges from each of the four level-1 binning units are summed from memory onto the amplifier input, then they are read. The charge then is reset via switch 240A on all red pixels, the amplifier gate, and the red charge memories 220A. A reset can be performed at this point because there are no higher levels of binning to be performed and the collected charges are no longer needed. Next, the same is done for the green and blue level-1 charges. It should be noted that the sequence of transferring the color charges can be performed in any order and is not intended to be limited to the specific example of red first, blue second, and green third. It should also be noted that while a three-color channel system is described in the example, a four-channel system that includes white pixels may also be used, again, with the charge transfer sequence not limited to a specific order. Further, it is not intended to restrict the system to four or fewer channels. There can be any number to suit the application. Additionally, there may be an optional shift register (not shown) between the color memories 220A, etc. to sum the colors to produce a final monochrome image for even higher sensitivity, FIG. 2C illustrates another exemplary implementation of CMOS sensor topology 200C according to an embodiment of the inventive approach. This example implements the sensor using a minimum number of components in a unit cell while still providing for one level of binning. This arrangement can perform either 2×2 pixel binning (binning unit 210A) or 4×4 pixel binning (binning unit 210B). The sensor memory 220 is used to sum multiple pixels of the same color during binning. With only one memory, the single level of binning must proceed one color at a time, with the pixels and the on-sensor memory 220 being reset upon completion of the readout of each binning unit 210A or 210B for a given color. Alternatively, multiple binning of each color can be performed provided all binnings of a given color are performed before proceeding to the next color.

Figure 3A:
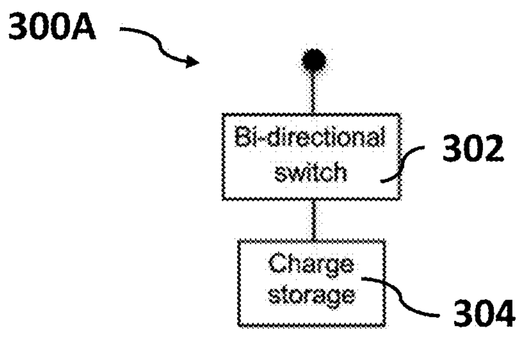
FIGS. 3A-3B illustrate examples of on-sensor charge storage approaches according to different embodiments.
Figure 3B:
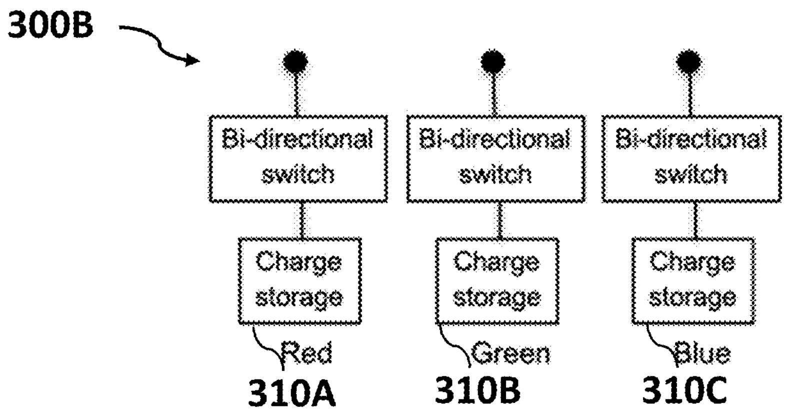

FIGS. 3A-3C illustrate examples of different configurations that can be used to implement on-sensor charge storage such as shown as 220 in FIGS. 2A and 2C, and 220A-220C shown in FIG. 2B. Each configuration of on-sensor charge storage provides its output after binning the pixels in accordance with the associated unit cell.

FIG. 3A illustrates an example of on-sensor charge storage 300A that includes a single bi-directional switch 302 and a charge storage component 304. On-sensor charge storage 300A can be configured to collect charges from each pixel in the unit cell 210. Since these charges may not be specifically separated by color, on-sensor charge storage 300A can be used to create a monochrome image. In certain implementations, the monochrome image generation process would involve reading a binned pixel from unit cell 210 and, instead of immediately resetting the on-sensor charge storage 300A after collection of a single color, aggregating the charges from all colors into the on-sensor charge storage. This aggregated charge may then be read before the charge storage is finally reset. In some embodiments, on-sensor charge storage 300A can be used for different colors if there is only one level of binning and the charges corresponding to the different colors are collected sequentially.

The concept of a "bi-directional switch" 302 speaks to the issue of "summing the charge", as opposed to "forcing the charge". A bi-directional switch operates similar to a CCD charge transfer register to take the charge off of an amplifier input and put it in memory for further binning, etc. Without such a switch, the only recourse would be to reset the input to allow a new charge to be read, but this would prevent further charge binning. Thus, the bi-directional switch accumulates or sums charge into memory, but after summing can work backwards to move charge from memory back onto the amplifier input for reading the binned charge. From this point, the charge can be reset, or, if there is to be further binning performed, the charge can be pushed back into memory for further binning. For multiple binning levels, there need to be enough memories for the level-1 binning group. Note that at each subsequent binning, less memory is required where the charge memory can be a subset of the level-1 memory. Thus, for example, in order to read out a unit cell containing 96×96 pixels (32×32 in each of 3 colors) with the binning groups of unbinned, 2×2, 4×4, and 8×8 binning, the following sequence can be followed:

Unbinned: Transfer charge from each of the 96×96 pixels (32×32 pixels in each of 3 colors) and put the charge on the appropriate amplifier input. After reading this charge, move this charge and sum it into the appropriate charge memory location of 48×48 memory locations (16×16 memory locations in each of 3 colors).

2×2 binned (level-1): Transfer charge from each of the 48×48 pixels (16×16 pixels in each of 3 colors) and put the charge on the appropriate amplifier input. After reading this charge, move this charge and sum it into the appropriate charge memory location of 24×24 memory locations (8×8 memory locations in each of 3 colors).

4×4 binned (level-2): Transfer charge from each of the 24×24 pixels (8×8 pixels in each of 3 colors) and put the charge on the appropriate amplifier input. After reading this charge, move this charge and sum it into the appropriate charge memory location of 12×12 memory locations (4×4 memory locations in each of 3 colors).

8×8 binned (level-3): Transfer charge from each of the 12×12 pixels (4×4 pixels in each of 3 colors) and put the charge on the appropriate amplifier input. After reading this charge, reset the charge and all of the 96×96 (32×32 pixel in 3 colors) charges on the pixels and memory locations in each unit cell to prepare for the next image.

FIG. 3B illustrates an example of on-sensor charge storage 300B that includes three separate charge storages 310A, 310B, 310C. Each of these charge storages within on-sensor charge storage 300B can be aligned with a specific color, e.g., red, green, or blue. In this illustration, the charge(s) for each color can be stored in its designated charge storage: e.g., red, green, and blue charges would be stored in charge storage 310A, 310B, and 310C, respectively. Additionally, in some embodiments, on-sensor charge storage 300B may be linked to a single amplifier (not shown). Using this charge storage architecture for each binning group, the binning at the next higher level can also be considered because the signal charges can be retained after binning and can be binned at the next courser level. In addition, the charge memories available at this level of binning are greater in number than that which is needed for the next coarser (higher) level. Consequently, these charge memories can be reused at the next coarser level. Finally, in applications with more than three colors, e.g., with white pixels, a $4^{th}$ color channel can be implemented.

Figure 4:
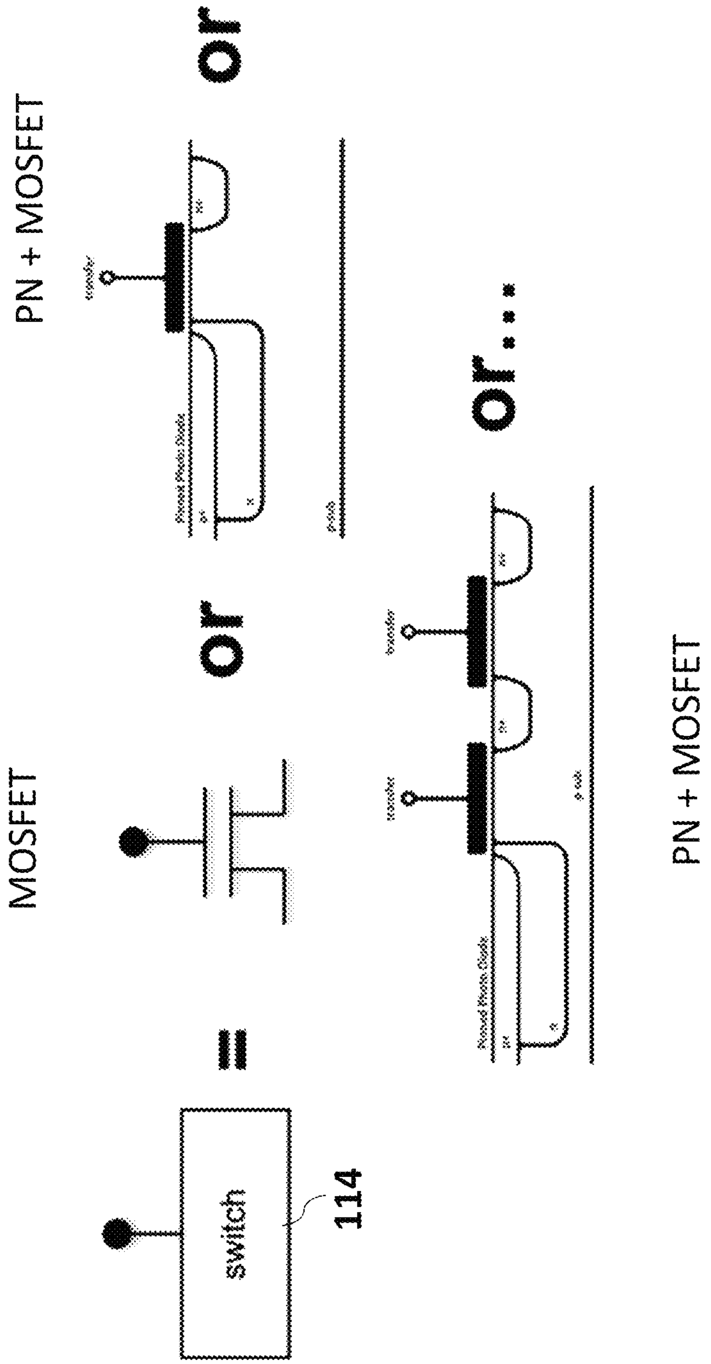
FIG. 4 illustrates examples of different switches according to embodiments.

FIG. 4 illustrates examples of different switches 114 that can be incorporated in the inventive sensor construction. For example, switch 114 can be implemented as a metal oxide semiconductor field effect transistor (MOSFET), PN junction MOSFET, or PNP MOSFET. Such switches are well known in the art such that it would be readily apparent to a person of skill in the art to employ these or other types of switches without deviating from the scope of the inventive scheme.

Figure 5:
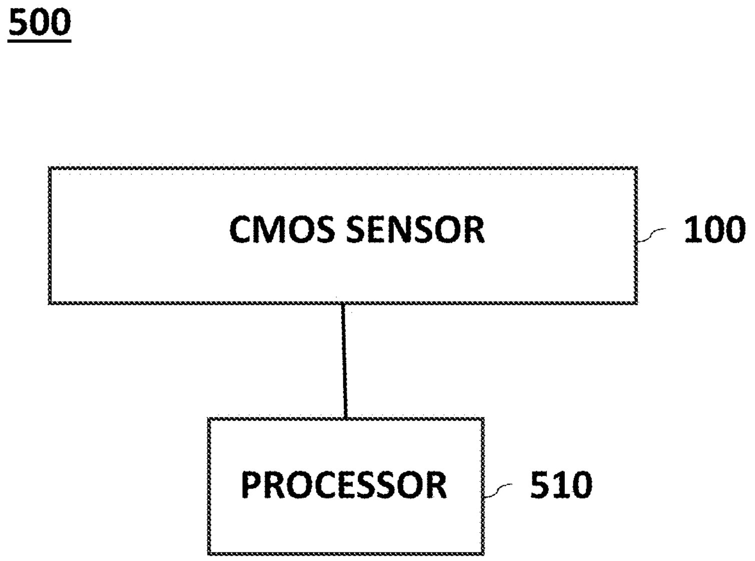
FIG. 5 is a block diagram representing a CMOS sensor connected with a processor according to some embodiments.

FIG. 5 illustrates a basic architecture for the controlling the inventive CMOS sensor using a processor 510 to instruct and manage binning operations via appropriate clocks, transfer instructions, and switch activation commands. While processor 510 may be integrated onto the same substrate as the sensor topology (e.g., 200A-200C), to conserve on-sensor real estate for essential detection and binning operations, processor 510 may preferably be located off-sensor on a separate substrate, connected via appropriate connectors as are known in the art. In some cases, the processor 510 may be incorporated into an electronic device that includes the CMOS sensor. The electronic device may be any electronic device that has image-capturing capabilities, such as a smartphone, surveillance device (military or commercial), laptop, personal computing device, tablet PC, and the like. Non-limiting examples of types of devices in which the inventive sensor can be employed include drones, unmanned aerial vehicles (UAVs), unmanned surface vehicles (USVs), unmanned ground vehicles (UGVs), uncrewed marine vehicles (UMVs), or unmanned underwater vehicles (UUVs). The electronic device may be incorporated in a wheeled vehicle, an aircraft, a satellite, or other devices or systems that include image processing functions.

In some embodiments, processor 510 can be configured to receive input from a user of the electronic device and subsequently activate the CMOS sensor 100 to capture an image. For instance, when a smartphone user selects an option to capture an image or record a video, the processor 510 activates CMOS sensor 100. Once activated, the sensor captures an image, which is then processed by the device in accordance with the inventive binning scheme.

The processor 510 can be configured, i.e., programmed via software, firmware, hardware, or a combination thereof, to control the operation of the on-sensor charge storage 220, switches 114, amplifier 230, and other elements of the CMOS sensor in accordance with the embodiments disclosed herein. The present disclosure does not limit the instructions related to the operation of the CMOS sensor 100 that can be executed by the processor 510.

Figure 6:
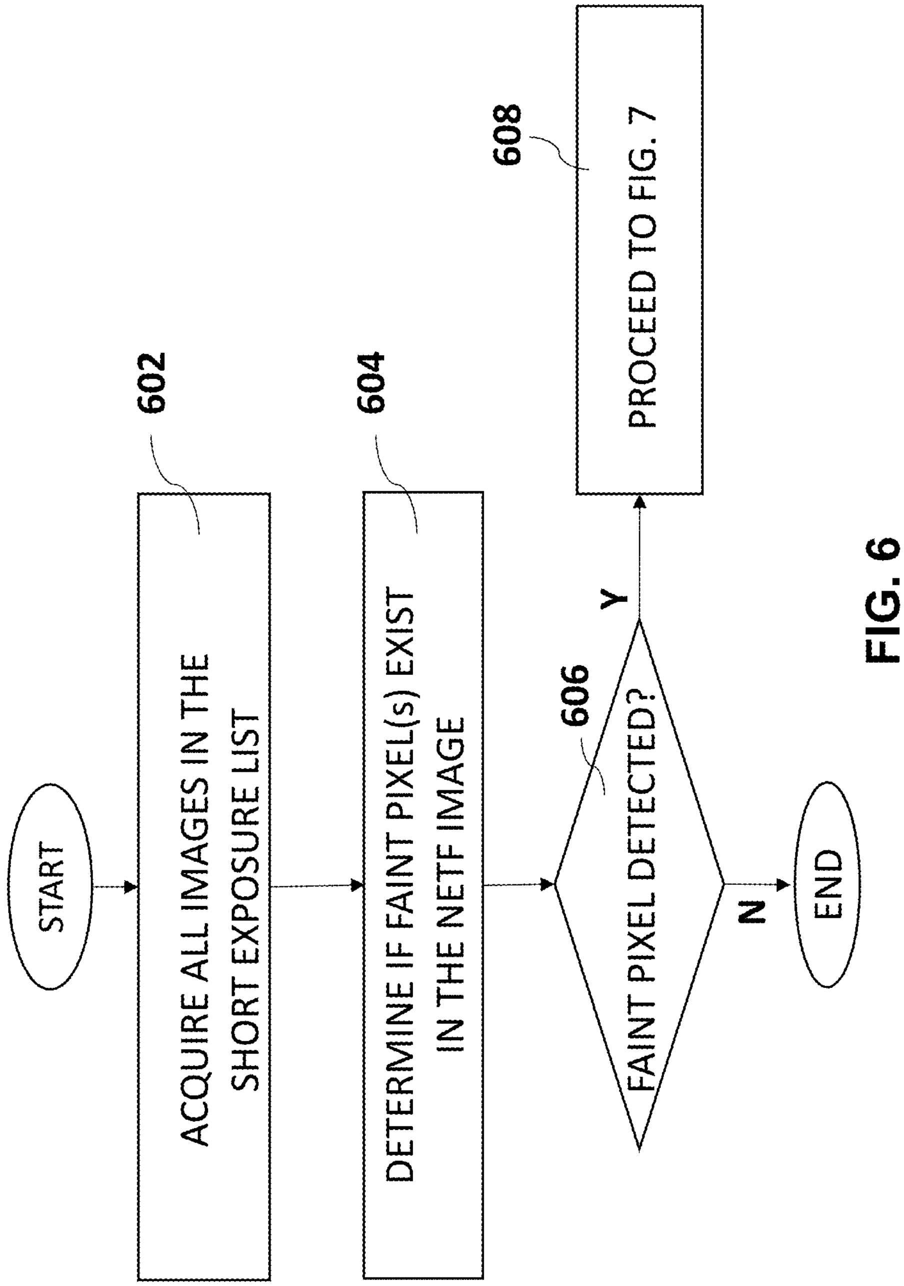
FIG. 6 is a process flow diagram of a method for determining "faint" pixel(s) according to some embodiments.

FIG. 6 illustrates an exemplary process flow 600 for a method for determining faint pixel(s) according to some embodiments. This sequence will typically be initiated and executed by processor 510. According to this sequence, image frames of the same scene with different exposure times (for t in the short exposure list) can be collected from the shortest to the longest (=NETF, or Nominal Exposure Time Frame). These frames can be used to detect images with bright objects that would be overexposed on the NETF. Such frames can generally be unbinned, providing the highest spatial resolution for the bright objects. Since the final image that will be assembled can have a very wide dynamic range, not all the pixels will have useable exposures in all frames.

At block 602, the CMOS sensor 100 acquires an image. In some examples, the CMOS sensor 100 can capture various image frames, collecting light at the pixels of the CMOS sensor 100 in various exposure time durations. In these examples, the frames can be generated at various time exposure durations, such as from a short exposure time, t1, to the longest exposure time of t(n). The longest exposure time of t(n) can generally be referred to as the NETF. In some embodiments, a single image can be acquired by selecting one image frame from the various image frames. The selection can be based on the exposure time, such that the image frame having the nominal exposure time can be selected. In some examples, processor 510 can be configured to acquire the single image by selecting an image frame corresponding to a certain time duration, such as nominal time duration. The user of the CMOS sensor 100 (or the user of the smartphone that implements the CMOS sensor 100) can select a specific time duration for the single image. In other cases, the CMOS sensor 100 can include a default time duration for selecting the single image.

At block 604, processor 510 can determine faint pixels for the NETF acquired in block 602 by reading the output charges of each pixel. Pixels having charges less than a threshold will be designated "faint pixels". In some examples, the signal-to-noise ratio (SNR) can be used for this determination, e.g., a SNR threshold may be set within processor 510, which then separates pixels into bright pixels and faint pixels. Then, processor 510 can read the output charge of pixels that correspond to the dark faint pixels. In some examples, if the output charge associated with the faint pixel is less than the threshold value, the frame will be flagged as having a faint pixel. The threshold for defining a faint pixel will typically be determined based on specific applications or required image quality.

Figure 7:
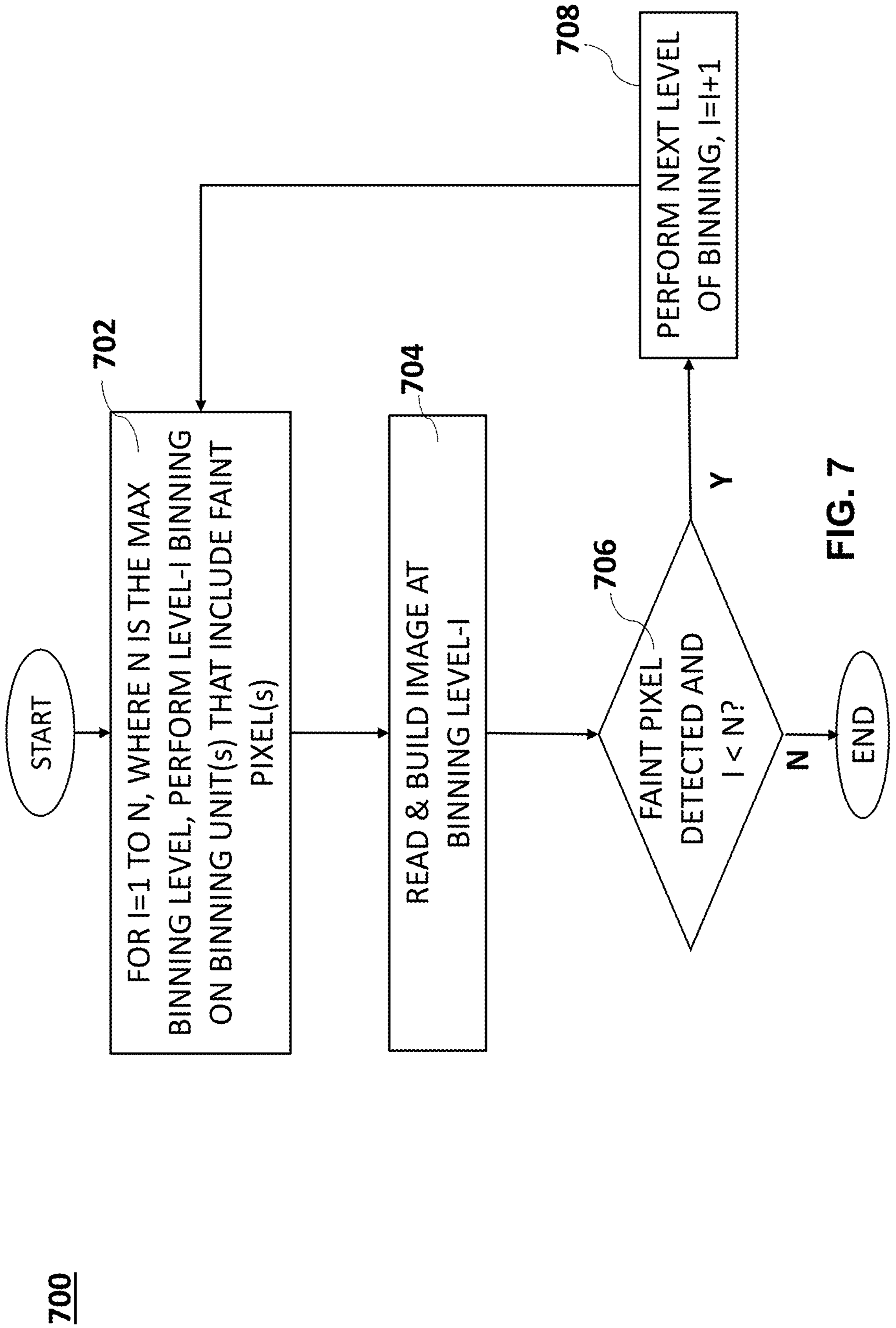
FIG. 7 is a process flow diagram of a method for binning pixels according to some embodiments.

At decision block 606, if the faint pixel(s) are detected at block 604, the process 600 can proceed to block 608, which leads to the flow diagram of FIG. 7. If faint pixel(s) are not detected at block 604, process 600 can be ended and processor 510 can proceed to generate a final image without further pixel binning operations.

FIG. 7 provides an exemplary process flow 700 for binning pixels in frames in which faint pixels have been detected in process 600. At block 702, processor 510 starts binning at level-I=1, and, if needed, can proceed through to maximum binning level N to bin, read and build (704) the level-I binned image. At 706, processor 510 determines if there are any level-I binning units with undetected signals (e.g., a faint binning unit, in which one or more pixels in the binning unit are faint). If there are faint binning units and the current binning level has been completed, the process continues, increasing the binning level. Once the maximum binning level has been exceeded or there are no remaining faint binning groups, the process stops and any faint binning units have their pixel values set at zero.

In some examples, faint binning groups can be identified by determining the signal-to-noise ratio (SNR) for each binning group and comparing that SNR to an SNR threshold that is determined based on specific applications or required image quality.

In some embodiments, the collected images from process 600 or 700 can be normalized for exposure time and/or light collection area and may be further corrected for flat-field, image motion, dead pixels or persistently saturated pixels, and read noise through correlated double sampling, etc. Many of these corrections can be nominally performed off-sensor, however, some, such as correlated double-sampling, must be performed at the time the sensor is read because it involves how the data is taken. For this correction, the amplifier input is reset and the output sampled, the signal charge is put on the amplifier input, the output is sampled, and these two values are differenced, which can remove read noise and capacitive reset (CkT) noise. Further, these frames may be merged (usually off-sensor) into a final exposure-time/light-collection-area normalized image. They can be merged while they are being collected, or they can be merged after all frames have been collected. Since multiple frames may have good SNR values for a given pixel, a final value of the pixel can be determined in a number of ways, e.g., the single best pixel value, the SNR weighted average of the pixel value, etc. The procedure used for selecting the final pixel value will affect the promotion of a faint pixel to a bright pixel. If multiple frames are used, some secondary data might need to be stored to complete the merger. Finally, since the binned frames have lower (and possibly different) spatial resolutions, before merging with the unbinned frames, the binned images can be "filled-out" to their original pixel resolution by placing an average value in each of the original pixels of the binning group pixels. One skilled in the art can also apply more sophisticated methods for filling out the original pixel values, for example, methods that employ a gradient in the image, etc.

FIGS. 8-11 illustrate examples of different color sampling schemes that can be used in implementations of the inventive approach. These color pixel arrays can provide improved color interpolation in the binned pixels.

Figure 8:
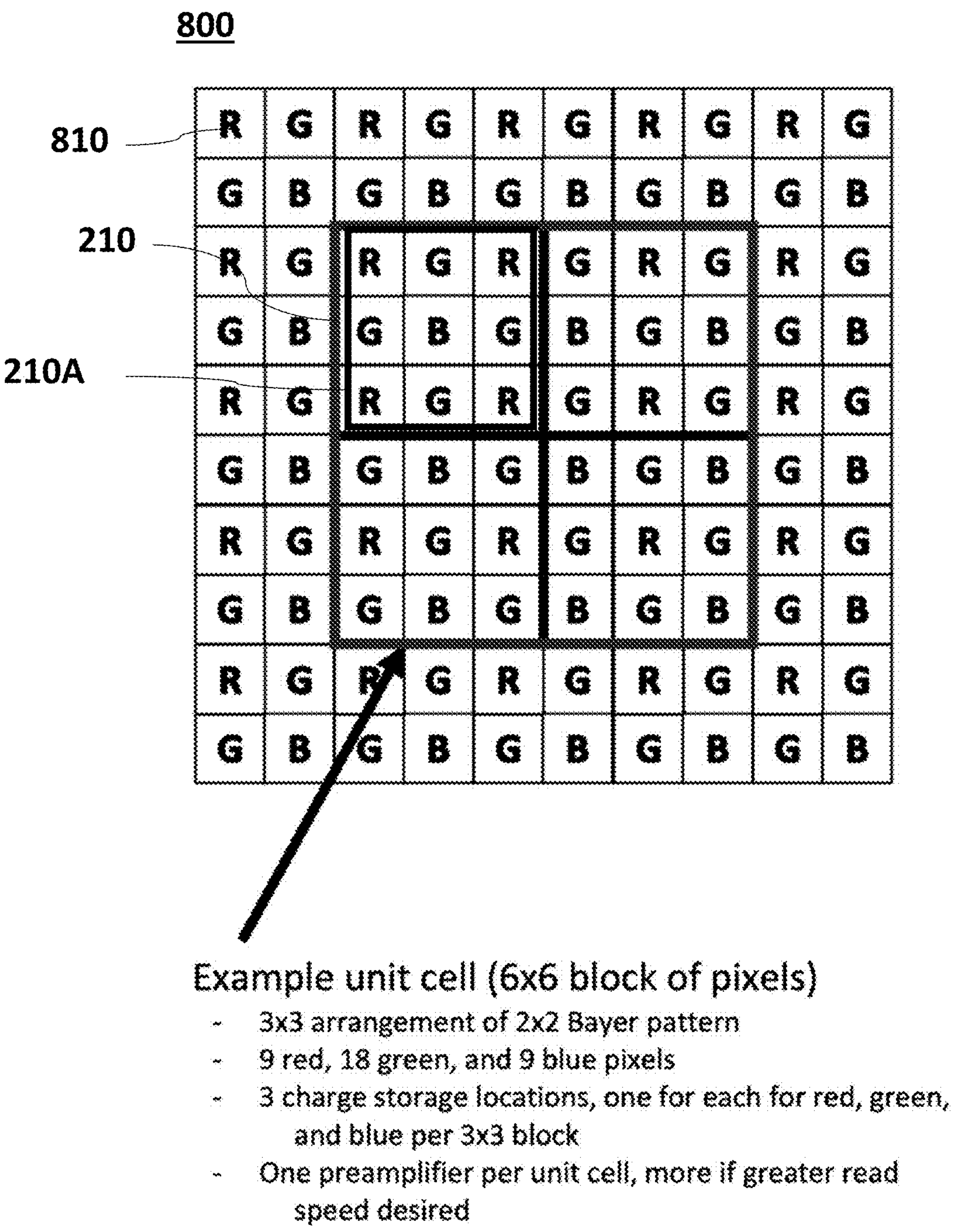
FIG. 8 illustrates a first exemplary implementation of an array of color filters for a unit cell.

Example 1: Unit Cell with 6×6 block of pixels: FIG. 8 illustrates an example of array of color filters 800, each pixel 810 can be associated with one of red, green, or blue color (or other pixel color not shown). In this example, unit cell 210 is a 6×6 array of pixels formed as a 3×3 arrangement of 2×2 Bayer patterns, which includes 9 red pixels, 18 green pixels, and 9 blue pixels. In addition, the unit cell 210 can include three charge storages 310A, 310B, 310C, one for each color, as illustrated in FIG. 3B. The unit cell 210 can include 4 level-1 binning groups 210A, of 3×3 pixels (or a smaller or larger array). In this example, there may be a single pre-amplifier per unit cell, or more pre-amplifiers if greater read speed is desired. In another implementation, the entire unit cell may be used as a level-2 binning group.

Figure 9:
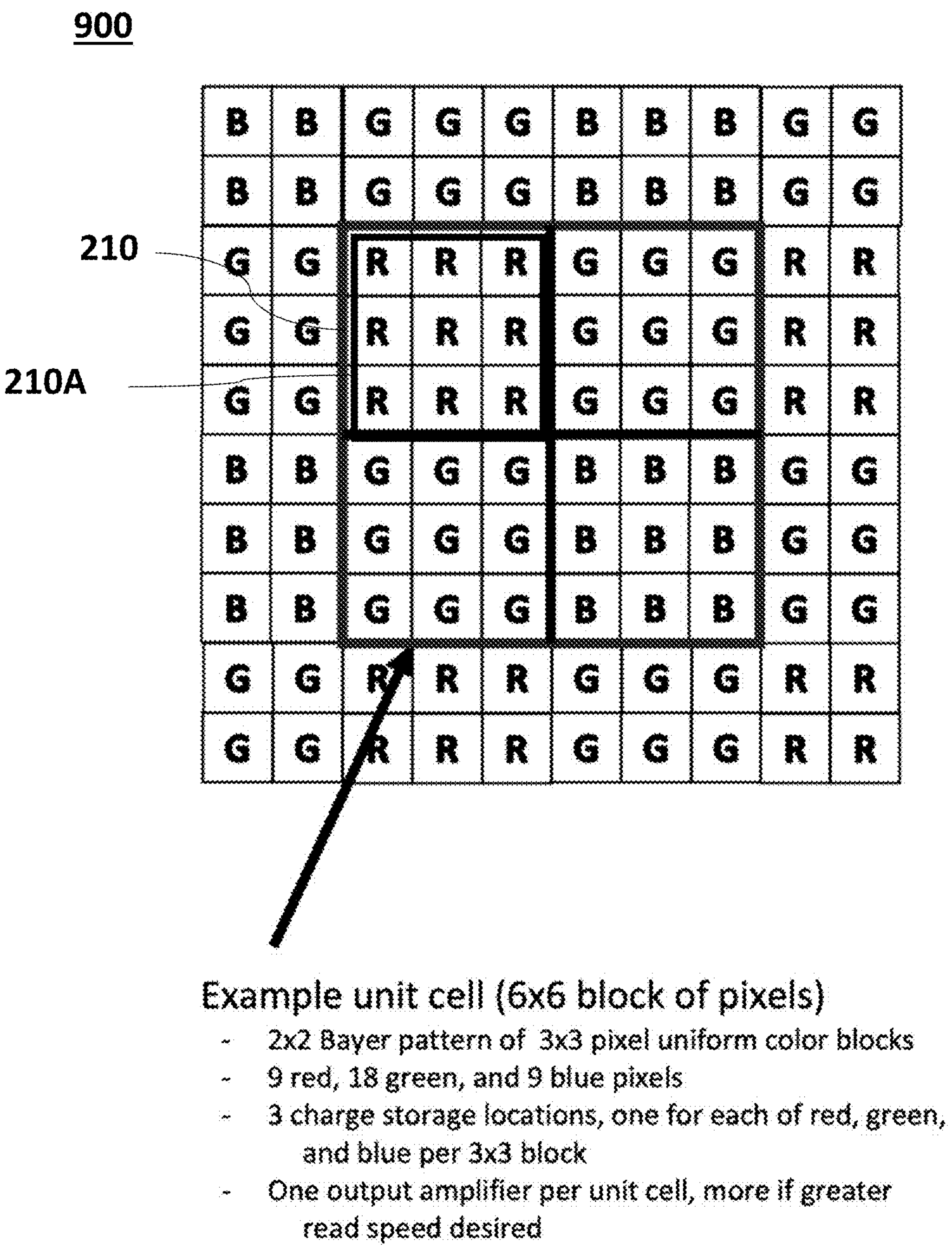
FIG. 9 illustrates a second exemplary implementation of an array of color filters for a unit cell.

Example 2: Unit Cell with 6×6 block of pixels: FIG. 9 illustrates an example of array of color filters 900. The array of color filters 900 can include single-colored pixels in large 3×3 blocks. In this example, unit cell 210 includes a 2×2 Bayer pattern of 3×3 pixels in uniform color blocks to form a 6×6 array. The unit cell 210 includes the same number of pixels as in Example 1, i.e., 9 red pixels, 18 green pixels, and 9 blue pixels, but in a different arrangement. Unit cell 210 can utilize three charge storages 310A, 310B, 310C, one for each color. As in the previous example, there may be a single pre-amplifier per unit cell, or more pre-amplifiers if greater read speed is desired. In some implementations, unit cell 210 can include four binning units 210A, composed of a 3×3 array of pixels.

Figure 10:
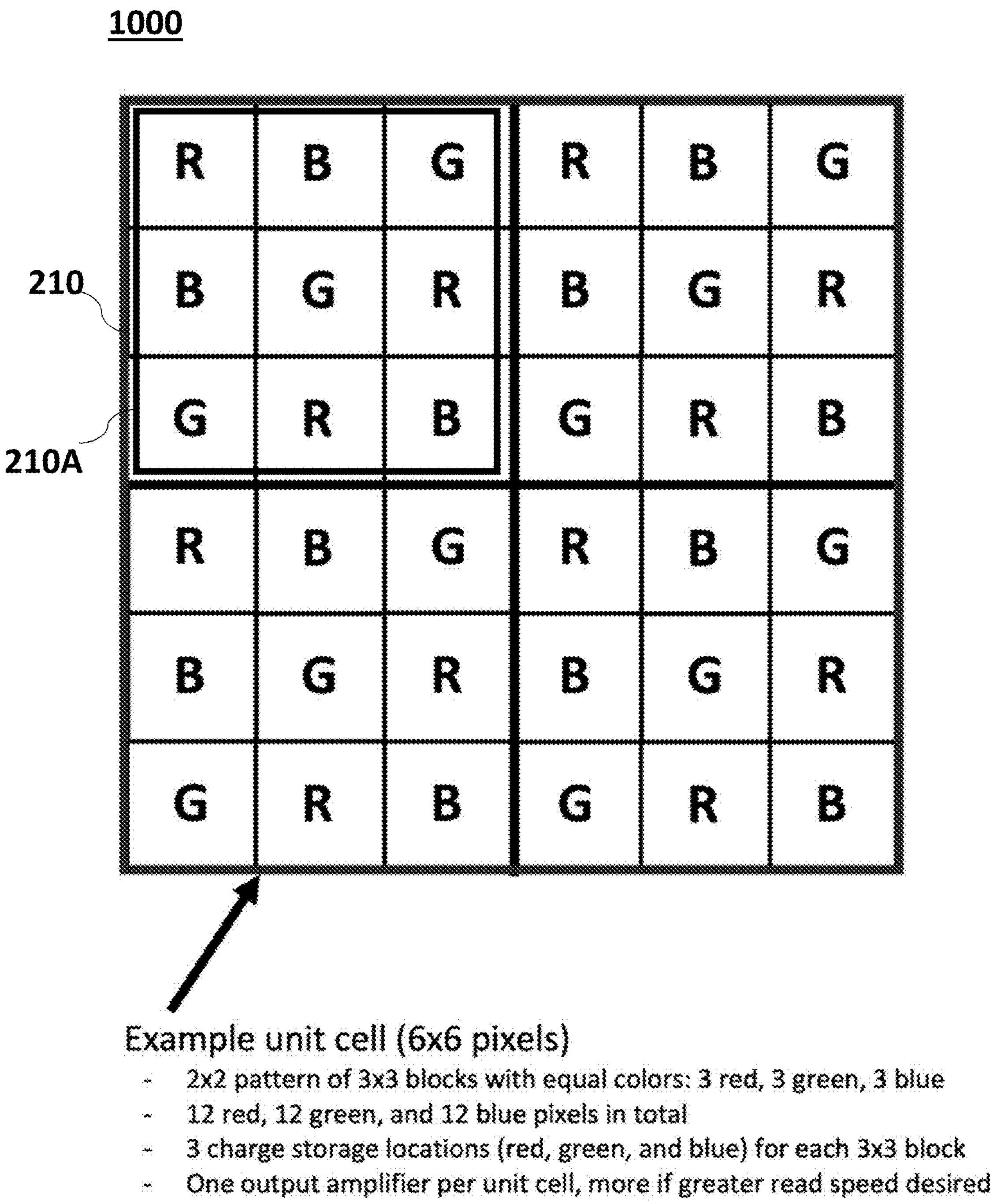
FIG. 10 illustrates a third exemplary implementation of an array of color filters for a unit cell.

Example 3: Unit Cell with 6×6 block of pixels: FIG. 10 illustrates yet another possible implementation of a 6×6 array of color filters 1000, with a 2×2 pattern of 3×3 blocks of equal colors: 3 red, 3 blue and 3 green. In this case, unit cell 210 includes 12 red pixels, 12 green pixels, and 12 blue pixels. In addition, unit cell 210 can utilize three charge storages 310A, 310B, 310C, for each 3×3 block. In some examples, as further illustrated in FIG. 10, the unit cell 210 can include 4 level-1 binning units 210A, of a 3×3 array of pixels. As in the other examples, there may be a single pre-amplifier per unit cell, or more pre-amplifiers if greater read speed is desired. In another implementation the entire unit cell could be used as a level-2 binning group.

Figure 11:
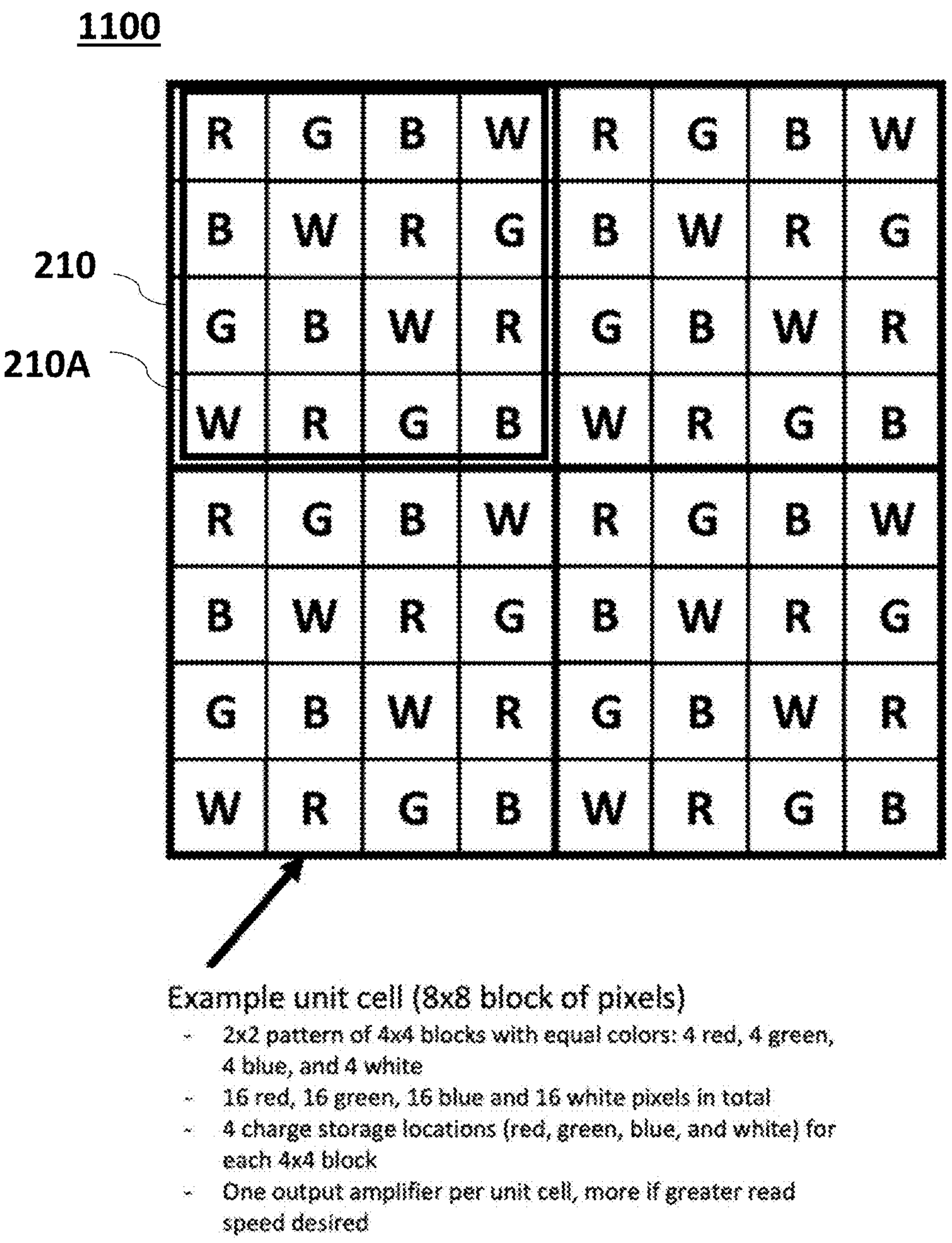
FIG. 11 illustrates a fourth exemplary implementation of an array of color filters for a unit cell.

Example 4: Unit Cell with 8×8 block of pixels: FIG. 11 provides an example of an 8×8 array of color filters 1100 with a 2×2 pattern of 4×4 blocks with equal colors. Unit cell 210 includes sub-binning units 210A each having 4×4 pixels: 4 red pixels, 4 green pixels, 4 white pixels, and 4 blue pixels. Unit cell 210 can utilize four charge storages, one for each color. By including the white colored pixels, the sensitivity associated with the array of color filters 1100 can be improved.

As will be apparent to those of skill in the art, while the examples described herein are mainly directed to a RGB three channel color model, other color models may be used, including, but not limited to CMY (cyan, magenta, yellow), and four channel models, e.g., RGBW (red-green-blue-white), and CMYK (cyan, magenta, yellow and key (black)).

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states.

While certain embodiments have been described, these embodiments have been presented by way of example only and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

The invention claimed is:

1. An image sensor comprising:

a substrate;

one or more on-sensor charge storage disposed on the substrate;

an output amplifier disposed on the substrate;

a pixel array comprising a plurality of pixels disposed on the substrate, each pixel configured to generate a charge in response to detection of light impinging on the pixel, the pixel array comprising one or more unit cells, each unit cell comprising a block of interconnected pixels;

wherein a plurality of binning units are defined within each unit cell, each binning unit comprising a subgroup of pixels, the plurality of binning units having a plurality of different binning unit sizes corresponding to different binning levels, wherein a first binning level comprises a smallest binning unit size and each subsequent binning level is a multiple of the binning unit size of a preceding binning level, and wherein a processor is configured for controlling the charges generated by the pixel array during an exposure period by:

(a) transferring charges for a first binning unit to the one or more on-sensor charge storage beginning with a first binning level;

(b) comparing the transferred charges to a threshold to determine whether any pixel within the first binning unit is a faint pixel having an intensity below the threshold;

(c) if a faint pixel is determined within the first binning unit, transferring charges for a second binning unit having a binning unit size larger than the first binning unit to the one or more on-sensor charge storage to provide a second binning level;

(d) comparing the transferred charges to the threshold to determine whether any pixel within the second binning unit is a faint pixel;

(e) if a faint pixel is determined within the second binning level, repeating transferring charges from subsequent binning levels until faint pixels are not determined; and summing the charges from the first binning level and any subsequent binning level to the output amplifier to generate an output comprising combined charges from each binning unit for the exposure period.

2. The image sensor of claim 1, wherein the block of interconnected pixels in each unit cell comprises a multi-channel array of color pixels, wherein steps (a) through (e) are performed separately for each color within the unit cell.

3. The image sensor of claim 2, wherein the one or more on-sensor charge storage comprises multiple on-sensor charge storages with one storage for each channel in the multi-channel array.

4. The image sensor of claim 3, wherein the multi-channel array comprises three or four colors.

5. The image sensor of claim 4, wherein, in each unit cell, each first binning unit comprises a Bayer pattern and each second binning unit comprises an array of first binning units.

6. The image sensor of claim 5, wherein each first binning unit comprises a 3×3 arrangement and the second binning unit comprises a 2×2 arrangement of first binning units.

7. The image sensor of claim 4, wherein, in each unit cell, each first binning unit comprises a color block of a single color and each second binning unit comprises a Bayer pattern of multiple different single-color blocks.

8. The image sensor of claim 7, wherein each first binning unit comprises a 3×3 arrangement of single-color pixels and each second binning unit comprises a 2×2 arrangement of first binning units having different color pixels.

9. The image sensor of claim 8, wherein the second binning unit comprises a Bayer pattern.

10. The image sensor of claim 4, wherein each first binning unit comprises a pattern of blocks having equal colors and each second binning unit comprises a matrix of equal color blocks.

11. The image sensor of claim 10, wherein each first binning unit comprises a 3×3 arrangement of different color pixels and each second binning unit comprises a 2×2 pattern of first binning units.

12. The image sensor of claim 1, wherein the block of interconnected pixels in each unit cell comprises a monochrome array of pixels.

13. The image sensor of claim 1, wherein the threshold is determined based on a signal to noise ratio (SNR).

14. The image sensor of claim 1, further comprising an on-sensor shift register in communication with the one or more on-sensor charge storage, the on-sensor shift register configured to receive and combine charges for each first level binning unit within the unit cell and transfer the combined charges to the one or more on-sensor charge storage.

15. The image sensor of claim 13, wherein the on-sensor shift register is further configured to receive and combine charges for each subsequent binning unit within the unit cell and transfer the combine charges to the one or more on-sensor charge storage.

16. The image sensor of claim 1, further comprising a reset switch configured to reset the one or more on-sensor charge storage after no further binning levels are required.

17. The image sensor of claim 1, wherein the exposure period comprises multiple exposure times, wherein different binning units are exposed for different exposure times.

18. The image sensor of claim 1, wherein the image sensor is incorporated in a smartphone.

19. The image sensor of claim 17, wherein the processor is associated with the smartphone.

20. An image sensor comprising:

one or more on-sensor charge storage configured for receiving charges from a pixel array comprising a plurality of pixels, each pixel configured to generate a charge in response to detection of light impinging on the pixel, the pixel array comprising one or more unit cells, each unit cell comprising a block of interconnected pixels;

wherein a plurality of binning units are defined within each unit cell, each binning unit comprising a subgroup of pixels, the plurality of binning units having a plurality of different binning unit sizes corresponding to different binning levels, wherein a first binning level comprises a smallest binning unit size and each subsequent binning level is a multiple of the binning unit size of a preceding binning level, and wherein a processor is configured for controlling transfer to the one or more on-sensor charge storage of the charges generated by the pixel array during an exposure period based upon detection of faint pixels at a given binning level, wherein charges are transferred to and accumulated at the one or more on-sensor charge storage beginning with a first binning level and continuing with subsequent levels if faint pixels are detected within the preceding binning level; and summing the charges from the first binning level and any subsequent binning level to an output amplifier to generate an output comprising combined charges from each binning unit for the exposure period.

* * * * *